F. HAMACHEK.
TAILINGS SEPARATOR.
APPLICATION FILED NOV. 19, 1917.
1,390,781.
Patented Sept. 13, 1921.
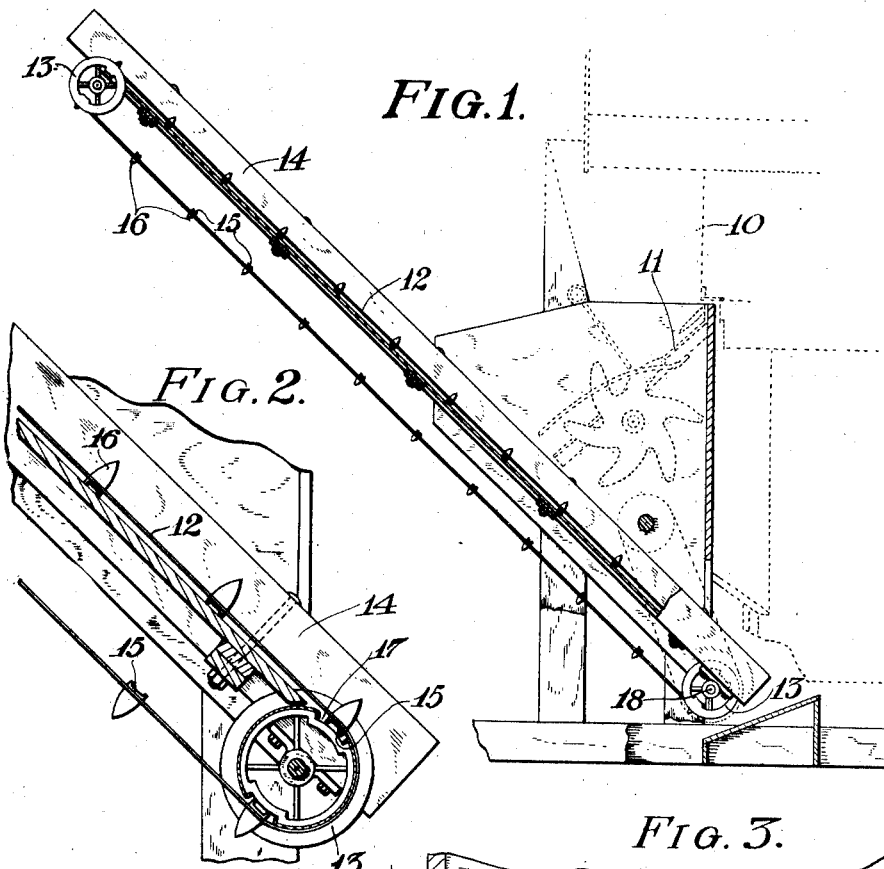
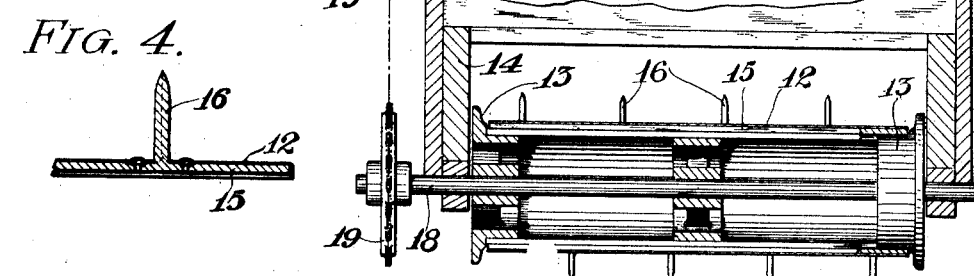
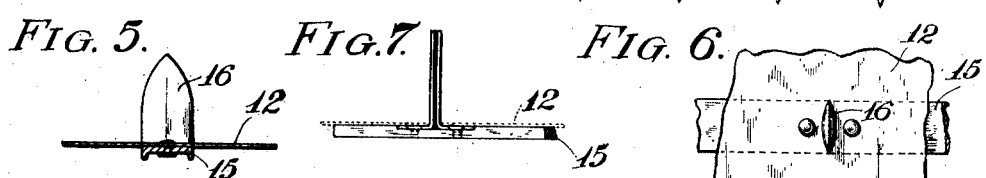
WITNESSES.
C. L. Waal
H. D. Chase
INVENTOR.
Frank Hamachek
R. S. Caldwell
ATTORNEY.

UNITED STATES PATENT OFFICE.

FRANK HAMACHEK, OF KEWAUNEE, WISCONSIN.

TAILINGS SEPARATOR.

1,390,781.  Specification of Letters Patent.  Patented Sept. 13, 1921.

Original application filed August 20, 1915, Serial No. 46,445. Divided and this application filed November 19, 1917. Serial No. 202,785.

*To all whom it may concern:*

Be it known that I, FRANK HAMACHEK, a citizen of the United States, and resident of Kewaunee, Kewaunee county, Wisconsin, have invented new and useful Improvements in Tailings-Separators, of which the following is a description, reference being had to the accompanying drawings, which are a part of this specification.

This invention has for its object to provide a tailings conveyer for pea separators which will more efficiently cause the separation of the loose peas from the vines and thus increase the amount of salvage.

An object of the invention is to improve upon the details of construction of the tailings conveyer whereby peas from the discharge chute and from the tailings may freely roll down the apron of the tailings conveyer while the tailings are being lifted thereby.

Another object for the invention is to provide the tailings conveyer apron with slats carrying fingers for engaging the tailings, such slats being beneath the apron and the fingers passing through the apron, thus giving rigidity to the fingers and avoiding the formation of ridges across the apron to interfere with the downward travel of the loose peas.

Another object of the invention is to stiffen the apron by means of such slats to hold it against collapsing, while a further object is to utilize the slats beneath the apron as cleats for coöperating with grooves or recesses in the drums or pulleys around which they pass and by fitting in such grooves or recesses serving to constitute a positive driving connection between such drums or pulleys and the apron.

With the above and other objects in view, the invention consists in the tailings conveyer for pea separators as herein claimed and all equivalents.

Referring to the accompanying drawings in which like characters of reference indicate the same parts in different views, Figure 1 is a central longitudinal sectional view of a tailings conveyer for pea separators constructed in accordance with this invention;

Fig. 2 is a similar enlarged view of the lower end thereof;

Fig. 3 is a sectional view through the lower pulley of the conveyer;

Fig. 4 is a longitudinal sectional view of a portion of one of the slats with an integral projecting tooth;

Fig. 5 is a transverse sectional view thereof;

Fig. 6 is a plan view thereof;

Fig. 7 is a view showing a modified form of tooth construction; and,

Fig. 8 is a plan view thereof.

In these drawings the discharge end of a pea separator 10 is shown in dotted lines with an inclined discharge chute 11 for delivering tailings from the pea separator onto the upwardly traveling inclined conveyer apron 12 of this invention.

The apron 12 of canvas or other suitable material, forms an endless belt passing around drums or pulleys 13 at either end of an inclined trough-like frame 14. The apron has cross slats 15 extending across it on its inner face so that said slats do not interfere with the loose peas rolling down the outer face of the apron, and fingers 16 on the slats project through openings of the apron to engage the tailings and cause them to travel upwardly with the apron and drop from the upper end of the conveyer. The slats 15 slide along the bottom of the frame 14 and hold the apron stretched its full width, but more particularly they give rigidity and strong attachment to the fingers. The fingers may be formed integral with the metal slats as shown in Figs. 4, 5 and 6, or they may be of any other desirable construction, such as of sheet metal suitably attached to the slats as in Figs. 7 and 8. The fingers are preferably narrow so as not to afford a place of lodgment for loose peas where the fingers meet with the apron as the peas would otherwise be carried up by them with the conveyer. The narrow fingers leave the peas free to roll down the conveyer, while the vines and other tailings are carried upwardly by the conveyer and discharged from the machine.

The pulleys 13 at the upper and lower ends of the conveyer are provided with grooves 17 extending from one end flange to the other to receive the slats 15 and form a positive driving connection therewith through which the motion imparted to the shaft 18 of one of the pulleys by a driving connection with a sprocket wheel 19 thereon, will be directly transmitted to the apron without slippage and the conveyer will be as positively driven as if it were of chain formation. Any tendency for the pulley to slip within the conveyer apron on account of the latter being saturated with the juice of the crushed vines will be effectively overcome by this positive driving connection between the slats of the conveyer apron and the grooved or slotted surface of the driving pulley. The grooves or slots in the surface of the idle pulley and the bearing for the slats provided by the bottom of the trough-like frame permit the apron to remain at the desired tension without being affected by the passage of the slats around the pulley, thus assisting in the even movement of the apron that is desired for conducting the tailings away from the loose peas. An alternate tightening and loosening of the apron that would result if the slats could not sink within the grooves or slots of the pulleys, and the flap thereof if not guided by the slats bearing on the bottom of the trough-like frame, would have a tendency to produce a shaking motion that would cause the loose pea pods to be carried downwardly with the peas. The present construction avoids such shaking of the apron and assures a steady movement thereof.

This case constitutes a division of application Serial No. 46,445, for pea separators, filed August 20, 1915, which in turn is a division of application Serial No. 714,581, for pea separators, filed August 12, 1912, and which resulted in Patent No. 1,153,304, dated September 14, 1915.

What I claim as new and desire to secure by Letters Patent is:

1. In a pea separator, an inclined conveyer receiving tailings from the drum of the pea separator and comprising an upwardly traveling chaff supporting separating apron, slats on the underside of the apron, and narrow fingers projecting upwardly from the slats through the apron, the apron between the fingers being free from obstruction to form smooth inclined surfaces to permit the peas to roll thereon.

2. A pea separator, comprising an inclined vine supporting separating apron, slats on the underside of the apron, narrow fingers projecting upwardly from the slats through the apron, the apron between the fingers being free from obstruction to form smooth inclined surfaces to permit the peas to roll thereon and a pulley around which the apron travels provided with grooves to receive the slats.

3. In a device of the character described, a frame, upper and lower pulleys thereon, a vine supporting apron in the form of an endless belt passing around the pulleys, cross slats on the under surface of the apron, there being grooves in the faces of the pulleys to receive the cross slats, and fingers secured to the cross slats and projecting from the upper surface of the apron with inclined smooth apron surfaces therebetween down which material may roll.

4. In a device of the character described, an inclined trough-like frame, rollers mounted at the ends thereof and provided with grooved surfaces, a vine supporting apron in the form of an endless belt passing around the pulleys, cross slats secured to the under surface of the apron and sliding along the bottom of the trough-like frame and adapted to enter the grooves of the pulleys, fingers secured to the cross slats and projecting from the upper surface of the apron with inclined smooth apron surfaces therebetween down which material may roll, and means for driving one of the pulleys.

In testimony whereof, I affix my signature, in presence of two witnesses.

FRANK HAMACHEK.

Witnesses:
R. S. C. CALDWELL,
H. D. CHASE.